United States Patent
Zavarise et al.

[11] Patent Number: 6,149,802
[45] Date of Patent: Nov. 21, 2000

[54] SOLVENT RECOVERY APPARATUS AND METHOD

[75] Inventors: Dino Louis Zavarise, Aurora; Kenneth Oswald Dunn, Richmond Hill; Bernardus Murray Antoine Henri Tangelder, London, all of Canada

[73] Assignee: Toronto Star Newspapers Ltd., Toronto, Canada

[21] Appl. No.: 09/050,926

[22] Filed: Mar. 31, 1998

[51] Int. Cl.[7] .................................................. B01D 17/032
[52] U.S. Cl. ......................... 210/104; 210/86; 210/167; 210/193; 210/224; 210/241; 210/248; 210/259; 210/295; 210/533; 210/537; 210/540; 34/72
[58] Field of Search ...................... 210/774, 767, 210/768, 770, 771, 799, 800, 805, 806, 241, 97, 86, 103, 104, 167, 193, 224, 248, 252, 258, 259, 294, 295, 533, 537, 538, 540; 34/72

[56] References Cited

U.S. PATENT DOCUMENTS

| | | | |
|---|---|---|---|
| 2,307,078 | 1/1943 | Reed | 260/109 |
| 3,594,314 | 7/1971 | Bilhartz et al. | 210/73 |
| 4,053,990 | 10/1977 | Bielinski | 34/156 |
| 4,074,984 | 2/1978 | Fuhring . | |
| 4,086,705 | 5/1978 | Wehr | 34/26 |
| 4,289,505 | 9/1981 | Hardison et al. | 210/669 |
| 4,315,822 | 2/1982 | Jaisinghani | 210/794 |
| 4,554,055 | 11/1985 | Rooney | 203/89 |
| 4,689,155 | 8/1987 | Knowlton | 210/708 |
| 4,708,775 | 11/1987 | McGregor et al. | 203/40 |
| 4,800,655 | 1/1989 | Mori et al. | 34/77 |
| 5,220,796 | 6/1993 | Kearns | 55/387 |
| 5,223,141 | 6/1993 | Brown et al. | 210/634 |
| 5,350,527 | 9/1994 | Kitko | 210/804 |
| 5,354,476 | 10/1994 | Kubo et al. | 210/679 |
| 5,688,076 | 11/1997 | Atkins | 210/241 |

Primary Examiner—Robert J. Popovics
Attorney, Agent, or Firm—Blake, Cassels & Graydon LLP

[57] ABSTRACT

A solvent recovery apparatus for recovering low volatility solvent from a washing fluid slop includes a settling system and a filtering system. The settling system includes one or more settling stages and an off-take by which settled, re-usable solvent may be recovered. The filtering system uses a single filter press to filter batches of wastewater, with solids, and batches of solvent sludge, with solids, such that cleaned wastewater filtrate may be discarded, benign removed solids may be dried and sent to landfill, and solvent filtrate may be returned to the input end of the solvent recovery apparatus for re-processing. The solvent recovery apparatus can use a two stage settling system which permits an initial separation of most of the wastewater, and a secondary settling of a solvent rich portion of the slop. The secondary settling can be performed with a system of alternating settling tanks in which one tank is allowed to settle while another is being filled. The apparatus operates at room temperature and can be assembled on a single skid for ease of installation.

10 Claims, 5 Drawing Sheets

SOLVENT RECOVERY APPARATUS AND METHOD

FIELD OF THE INVENTION

This invention relates to an apparatus and method for recovering a washing solvent from an emulsified mix of water, solvent, fibrous matter, and other impurities. In particular it relates to an apparatus for containing a dirty mixture having separating vessels and filtering equipment by which the components of the dirty mixture may be separated to permit recovery of at least a portion of the washing solvent for subsequent re-use.

BACKGROUND OF THE INVENTION

Modern offset printing presses require the use of cleaning solvents. Traditionally solvents have been of the high volatility, petroleum based type, having relatively low boiling points. The solvents are used to clean the printing 'blankets', printing rollers, the press frames, and areas adjacent to the presses, and are typically referred to as "blanket and roller wash". The offset press printing blankets are rubberized sheets used to transfer the printing image to a moving paper, typically a web of newsprint, and as such must be cleaned regularly to remove the debris that builds up on the blanket during the printing process such as pigments, paper fibre lint and ink oils. Similarly the printing rollers which transfer the ink from the ink trays to the printing plates as well as the adjacent areas of the printing plant require cleaning. It is advantageous to be able to recover as much of the spent cleaning solvent as possible. First, recovery reduces the amount and disposal costs of waste chemical fluids released from the printing plant. Second, there is a savings to be made in re-using the solvent rather than purchasing virgin material.

In the blanket cleaning process, the solvents are normally mixed with water as water softens and loosens the paper fibres, thus allowing the solvents to penetrate and remove the inks. Typical recovery processes involve separating the solvent from water based diluents and from solids in the dirty mix, such as fibres, ink oils and pigments, by filtering, distillation and centrifuge methods. Filtering processes suitable for solvent recovery in the fine paper printing process may tend to be much less efficient with the dirty fluid mix from newspaper printing presses due to the much larger quantity of paper fibre. This paper fibre, or lint, combined with clays used in printing, tends to clog filters. The filter elements may be expensive, and the system may require a significant energy input as the pressure drop across the filter elements rises.

Distillation methods tend to consume more energy than may be desirable, and may not achieve satisfactory results when the fractions being separated by distillation have similar boiling points, or have a confused series of boiling points for various components. Another issue which may arise with distillation equipment is the need for improved fire protection if the distillation process includes flammable liquids or gases, and may require improved and expensive ventilation equipment to maintain a safe working environment. Conversely, the use of lower volatility solvents with higher boiling point ranges which produce reduced levels of toxic vapours in the work place air may tend to exacerbate the problem of distillation techniques because of the much higher temperatures required.

Centrifugal methods require a one or two stage centrifuge, typically an expensive piece of equipment, and typically have a relatively low overall processing rate. Ultrasonic filtering is also known, but once again requires more electrical equipment.

A second concern relates to the cleaning rags used to scrub the offset press blankets and to wipe the presses generally. At present these rags may be sent to a general laundry service which neither collects nor recycles the solvent, but rather may flush it away in the laundry wastewater. Cloth life between washing, solvent recovery, and cost savings could all be achieved if the solvent could be extracted from the cleaning rags and recycled.

It would be advantageous to have a relatively simple, low cost apparatus for reclaiming offset press washing solvent.

SUMMARY OF THE INVENTION

In a first aspect of the present invention there is a solvent recovery apparatus for reclaiming solvent from an emulsified water, oils, solids and solvent slop, comprising a settling system for receiving and settling the slop; an off-take for drawing a settled, re-usable solvent portion of the slop from the settling system; a filtering system for receiving the balance of the slop from the settling system, having at least one filter element and being operable to separate the solids, a waste water filtrate and a solvent filtrate; and the filtering system having a discharge whence solvent filtrate can be returned to the settling system.

In a second aspect, the invention further comprises: a first settling stage for initial settling of the slop into a solvent rich stratum and at least one other stratum; and a second settling stage for receiving the solvent rich stratum from the first settling stage, the off-take being connected to the second settling stage.

In a further aspect of the foregoing invention, the settling system comprises a stratum differentiator for directing the solvent rich stratum to the second settling stage and for directing the balance of the slop toward the filtering system.

In a still further aspect of the invention the settling system further comprises: a first settling stage outlet leading to (a) a first branch to the filtering system, and (b) a second branch to the second settling stage; valving for opening and closing the branches, and a sensor for controlling operation of the valving; the sensor operable on detection of the solvent rich stratum to cause the valving to open the second branch and close the first branch.

In a further aspect of the aspect of the above noted invention in which there is a second settling stage, the second stage has at least one secondary settling vessel in which the solvent rich stratum can settle into the re-usable portion and a sludge; and the filtering system has an intake connected selectively to receive (a) solvent poor strata from the first settling stage, and (b) sludge from the second settling stage.

In a further aspect, the invention includes a method of recovering solvent from an emulsified water, ink oils, solids and solvent slop, comprising the steps of: a) collecting the slop in a solvent settling system and permitting it to stratify; b) withdrawing a settled, re-usable portion of the slop; c) transferring the balance of the slop to a filtering system; d) filtering the balance of the slop to separate the solids therefrom and to produce a solvent filtrate and a wastewater filtrate; and e) returning the solvent filtrate to the solvent settling system.

In a further aspect of that method all of said steps are performed in an environment having a temperature range of 1 to 50 degrees C.

In a yet further aspect of that method, step (a) includes (a) (i) collecting the slop in a first solvent settling stage and allowing it to stratify into a solvent rich layer and at least one other layer; and (a)(ii) transferring the solvent rich layer to a second solvent settling stage and allowing it to settle to yield the re-usable solvent portion and a sludge portion.

Again, in a still further aspect of the methods, the step (a)(ii) of transferring includes releasing a flow from the first stage monitoring the flow for a property difference between the solvent rich layer and the at least one other layer and altering the direction of flow after detecting the property difference to separate the solvent rich layer from the at least one other layer.

In yet an even further aspect of the method, the step (a)(ii) includes selecting a vessel for receiving the solvent rich layer from one batch of slop, while another solvent rich layer from another batch of slop settles in another vessel.

In another aspect of the method, the step of filtering includes one of (a) filtering at least one batch of the other at least one layer followed by filtering at least one batch of the sludge portion; or (b) filtering at least one batch of the sludge portion followed by filtering at least one batch of the at least one other layer.

BRIEF DESCRIPTION OF THE DRAWINGS

For a better understanding of the present invention and to show more clearly how it may be carried into effect, reference will now be made by way of example to the accompanying drawings, which show an apparatus according to the preferred embodiment of the present invention and in which.

DETAILED DESCRIPTION OF THE PREFERRED EMBODIMENT

Figure 1A:
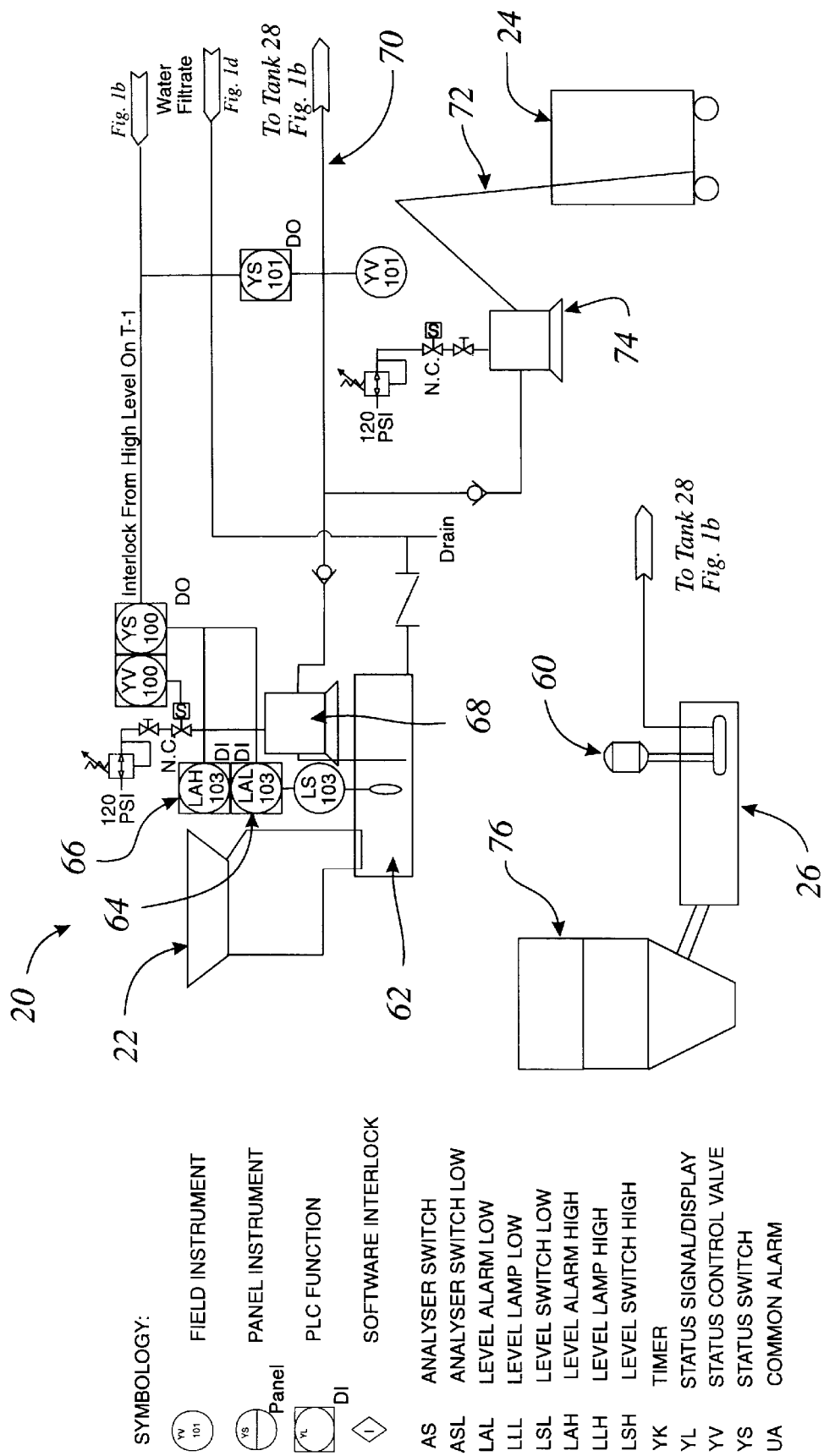
FIGS. 1a, 1b, 1c and 1d are general schematic diagrams of a solvent recovery apparatus according to the present invention.

Referring to FIGS. 1a through 1d, the apparatus will be described initially in a general conceptual manner, commencing with the input stages of the apparatus and working generally toward the output stages, and latterly in a more detailed manner.

The overall solvent reclamation apparatus is indicated generally as 20, and is designed to receive an emulsified slop made up primarily of dirty waste-water, blanket wash solvent, ink oils, pigments, clay, and paper fibre lint, input from a sink 22, a drum 24 from a rag sump 26 or dirty solvent from the ink cassette washing machine (not shown). The wastewater is transported to a 400 gal. settling tank 28 where it undergoes a first stage of settling. An initial settling over a period of one to two hours allows stratification into three layers. The lower layer 30 is predominantly dirty water, and is reasonably sharply segregated from the middle layer 32 which is a mix of solvent, the great majority of the paper fibre lint, clays, and ink pigments. The top layer 34, roughly 15% by volume, is predominantly blanket wash solvent, ink oils, and some solids such as pigments and some paper fibre lint.

Once the initial settling has occurred the stratified liquid is drawn out of settling tank 28. Lower layer 30 is directed to a 600 gal. wastewater tank 36. Upper layer 34 and middle layer 32 are directed to undergo a second stage of settling in one or the other of two 400 gal. solvent tanks 38 and 40. The mix sent to wastewater tank 36 is subsequently transported to a filter press 42 through which water filtrate may pass. The water filtrate is then clean enough to discard. Material trapped by the filter is dried and removed from the filter in a cake for landfill disposal.

The mix sent to solvent tank 38 or 40 is allowed to collect, and settle, for 10 to 14 days, by which time the ink oils and solids may sink to form a sludge 44 at the bottom, with a more or less clear upper portion 46, suitable for decanting to a 500 gal. reclaimed solvent tank 48 where it may await re-use.

After decanting upper layer 46, sludge 44 is stirred up and then transported to filter press 42. The liquid solvent filtrate is collected in a buffer tank 50 and later returned to settling tank 28 for another pass through the system. The solids, primarily ink oils, pigments, and lint collected in filter press 42 are, as before, dried and removed as a cake for landfill.

In summary, solvent reclamation apparatus 20 has only three outputs. The first output is reclaimed solvent. The second is filtered wastewater that is clean enough for safe discard. The third is an organic solid cake which is safe for landfill disposal.

Solvent reclamation apparatus 20 will now be described in greater detail, commencing with FIG. 1a. Sink 22 drains into a sink sump 62, monitored by a level sensor 64 which senses for high and low-level alarm conditions. Provided that settling tank 28 is not already full, a sink sump diaphragm pump 68 draws from sump 62 and expel the dirty slop down a 1 inch PVC pipe 70 which empties into settling tank 28.

Alternatively, dirty slop may be delivered to apparatus 20 in moveable drum 24. Again, provided settling tank 28 is not already full, the dirty slop is drawn through a hose 72 by a diaphragm drum pump 74 whose outlet is joined by a tee into pipe 70, and delivered to settling tank 28.

In a third alternative, a wiper centrifuge 76, conceptually similar to a spin dryer, is used to spin a load of cleaning rags, thereby extracting dirty liquid which collects in rag sump 26. A sump pump 60 having float controls is used to pump dirty slop from sump 26 into tank 28. The composition of the slop pumped from sump 26 will vary depending on whether water soaked wipers or solvent and ink soaked wipers are centrifuged, or whether dirty solvent from the ink cassette washer has been collected.

Figure 1B:
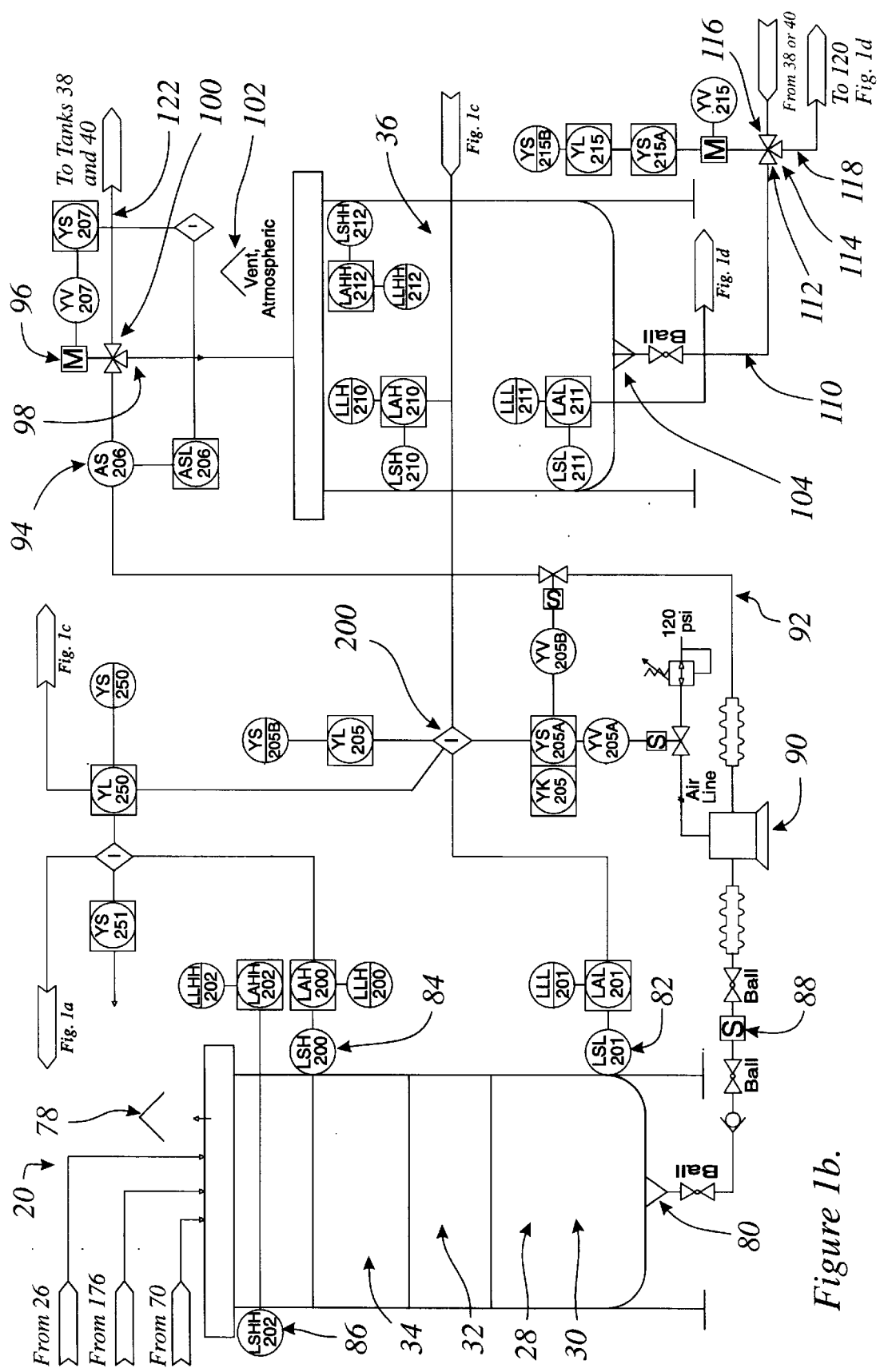

Referring to FIG. 1b, settling tank 28 has an atmospheric vent 78 by which vapours or smells emanating from tank 28 may be carried away; an outlet in the nature of a bottom drain 80 by which the stratified slop may be conducted away from tank 28; a low level switch 82 for indicating when tank 28 is substantially empty; a high level switch 84 activated when tank 28 is full to prevent any other pump from operating to add slop to tank 28; and an overflow warning sensor 86 which activates a warning when the level of liquid in tank 28 exceeds the full level.

Flow leaving tank 28 through drain 80 is carried through more PVC pipe to a strainer 88 for removing items that might otherwise damage pumps or filters elsewhere in the system, and onward to a diaphragm transfer pump 90, whose outlet gives onto a ¾ inch PVC pipe 92 leading to a conductivity sensor 94 located upstream of a three way valve 96 having a first branch, or first outlet 98, leading to waste-water tank 36, and a second branch, or second outlet 100, leading to solvent tanks 38 and 40, such as may be selected.

Provided that neither waste-water tank 36 nor the currently selected one of solvent tanks 38 and 40 is full, transfer pump 90 will operate to draw slop out of tank 28 when high level switch 84 is activated, and will shut off when the level of slop in tank 28 falls far enough to activate low level switch 82.

Inasmuch as lower layer 30 has dissimilar conductivity from upper layer 34 and middle layer 32, and the transition from layer 30 to layer 32 is relatively sharp, conductivity sensor 94 senses the conductivity of liquids passing it in pipe 92 and is calibrated to cause layer 30 to be directed through first outlet 98 to waste-water tank 36, and, when activated by the different, lower conductivity of layer 32, to cause valve 96 to close outlet 98 and open outlet 100 such that the solvent rich liquid of layer 34 and middle layer 32 is directed toward one or the other of solvent tanks 38 or 40, as then selected.

Waste-water tank 36 has a vent 102 for carrying off undesirable gases and odours; a bottom drain 104; a high level switch 106, and an overflow switch 108 activated if the level of liquid in tank 36 rises past high level switch 106. Drain 104 gives onto a 1.5 inch drain PVC pipe 110 leading to a three way valve 112 having a waste-water inlet 114 connected to pipe 110, a solvent tank inlet 116, and an outlet 118 leading to a filter press pump 120. Provided that filter press 42 is ready, and provided inlet 114 of valve 112 is open, an accumulation of waste-water and solids will eventually activate high level switch 106, causing pump 120 to empty tank 36 to the point at which low level switch 108 is activated to turn pump 120 off.

Figure 1C:
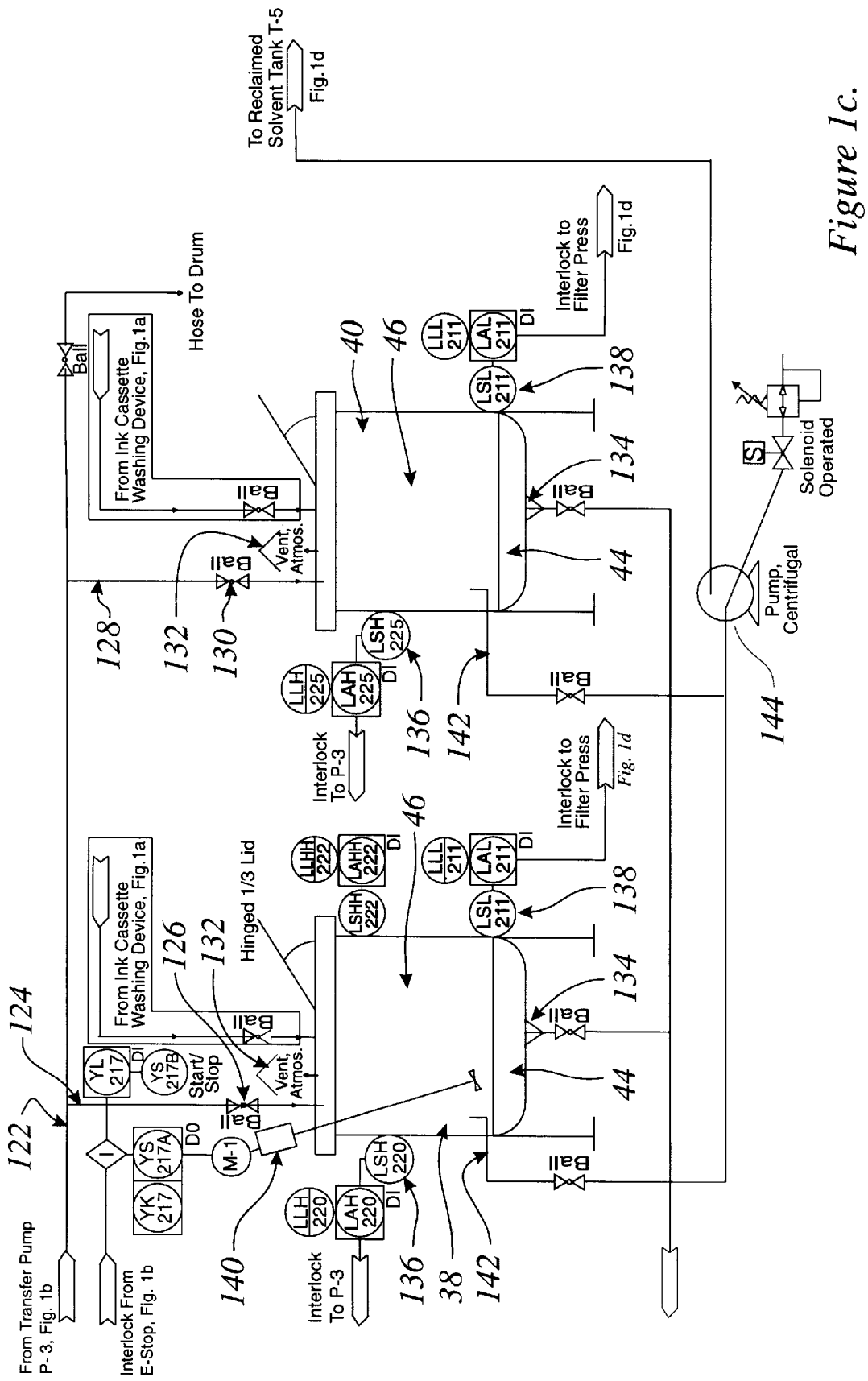

Referring to FIG. 1c, solvent tanks 38 and 40 are identical and are intended for alternate use. That is, while fluid is being collected in tank 38, the material in tank 40 will be undisturbed so that solids may settle out. After sufficient settling of tank 40, it will be emptied, and then tank 38 will be left to settle while tank 40 is being refilled. In the preferred embodiment the filling period is of the order of 10 to 14 days. Thus a pipe 122 leads from outlet 100 of valve 96 to either a first branch 124 controlled by a ball valve 126, or to a second branch 128 controlled by a ball valve 130, branches 124 and 128 leading to tanks 38 and 40 respectively. Each of solvent tanks 38 and 40 is provided with a vent 132, a drain 134, a high level switch 136, a low level switch 138, an agitator 140 (not shown for tank 40), and a decanting tap 142 leading to a centrifugal solvent reclamation pump 144.

When, for example, high level switch 136 of tank 38 is activated, at the next opportunity when filter press 42 is available, tank 40 will be emptied, outlet 128 will be closed and outlet 130 will be opened, leaving tank 38 to settle. When high level switch 136 of tank 40 is activated tank 38 is emptied, first by using reclamation pump 144 to draw off through decanting tap 142 the upper, settled portion of fluid which, although containing some residual ink oils, is pure enough to be recycled. Second, when solvent reclamation pump 144 can not draw any more fluid, agitator 140 is used to stir up the sludge remaining in the bottom of tank 38 so that it may more easily flow out drain 134 when inlet 116 of valve 112 is opened to permit flow to filter press pump 120. Although agitator 140 is shown as a mechanical stirring device, and such a device could be used, it is preferred to employ a release of compressed air from a circular piping system located at the bottom of tanks 38 and 40. This appears to give better agitation of the slurry than the originally installed impeller. Sludge will continue to be pumped out of tank 38 until low level switch 138 is activated, turning off filter press pump 120, closing outlet 130 and opening outlet 128 of valve 126. This cycle will then repeat while tank 38 fills and tank 40 settles.

Figure 1D:
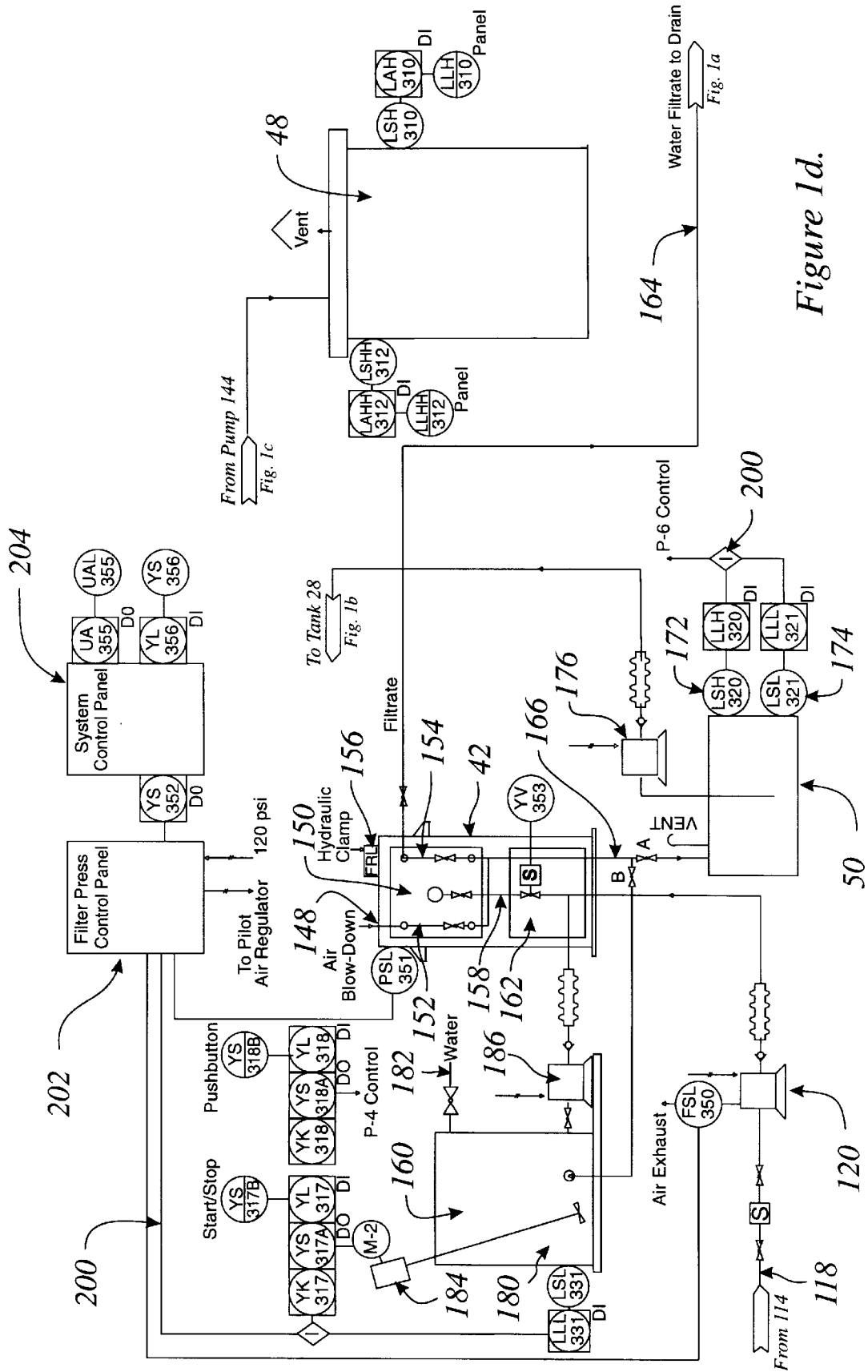

Referring to FIG. 1d, filter press 42 is made of a series of filter elements 150 clamped together between an inlet header 152 and an outlet header 154 by a hydraulic clamp 156. Inlet header 152 has a liquid feed pipe 158 which may receive fluid from either filter press pump 120 or from a filter aid pre-coating assembly 160. Header 152 also has an air blow down port 148 through which compressed air may be introduced to dry residue left on filter elements 150. The dried residue forms a cake which may be removed in a bin 162 and disposed of as land fill.

Outlet header 154 is connected to a water drain 164, which is open when waste-water is being processed in filter press 42. Outlet header 154 is also connected to a solvent drain pipe 166 which may serve any of three purposes. First, drain pipe 166 may carry filter aid coating material to be returned to coating assembly 160, as described below. Second, it may drain away liquid filtrate to buffer tank 50 when fluid from solvent tank 38 or 40 is being filtered through filter assembly 42. Third, during the residue drying process, it carries away exhaust air, and the liquid droplets of solvent suspended in the exhaust air. In the second and third instances solvent filtrate and aspirated droplets are carried to solvent buffer tank 50 which has high level and low level switches 172 and 174. These switches start and stop a filtrate pump 176 according to the level of filtrate collected in tank 50. Filtrate pump 176 is used to pump the liquid collected in tank 50 back to settling tank 28 for another pass through the system, and is prevented from operating if settling tank 28 is already full, that is, if settling tank high level switch 84 is activated.

Finally, filter aid coating assembly 160 comprises a pre-coat tank 180 which receives water from a water inlet 182, and filter aid powder added periodically by hand. A mixer 184 is used to mix the filter aid powder with water to yield the pre-coating liquid, or slurry. A diaphragm pre-coat pump 186, whose outlet is teed into feed pipe 158, is used to pump the pre-coating slurry into filter press 42. The pre-coating slurry is recirculated back to tank 180 through a return pipe 188 connected by a tee into solvent drain pipe 166.

In operation, filter aid coating assembly 160 is used to coat filter elements 150 before each batch of waste-water or solvent is passed through filter press 42, to yield a finer resolution filter. Clearly this coating process cannot occur while the filter press is in use, and will not be much use after the batch of dirty solvent mix has been processed. For this reason mixer 184 and pre-coat pump 186 are subject to an electrical interlock which prevents operation while press filter 42 is in use.

Figure 2:
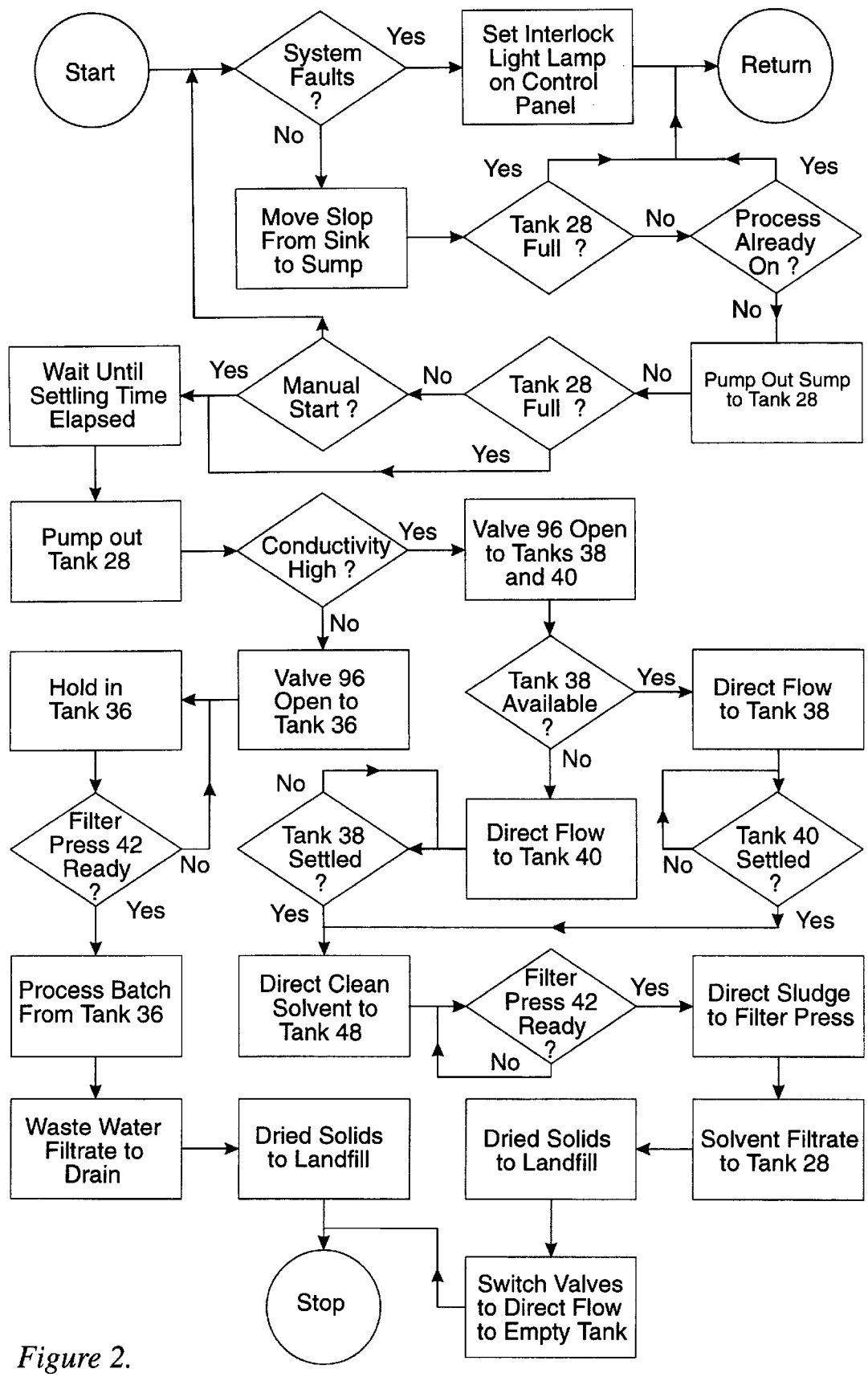
FIG. 2 is a flowchart setting out a series of steps by which the apparatus of FIGS. 1a through 1d may be used to recover solvent.

The operation of the system, and the logic governing that operation will now be considered with the aid of the flow chart of FIG. 2. To commence, dirty slop cannot be added at the input end of the system unless there is room for it in the downstream stages. To that end there is an electrical interlock system 200 linking all of pumps 68, 74, 90, 144, 120, 176 and 186 with Filter Press Control Panel 202 and System Control Panel 204.

The first decision box 210 requires a check for all system faults. When a new batch of slop is available at, for example, sink 22, the system checks whether settling tank 28 is at its full or emergency high level conditions. If there are no system faults the slop can be dumped into from the main recovery sink, turbo sink 22, and allowed to collect in the sump 62.

The next system decision, in decision box 220, is to determine whether (a) tank 28 is full or (b) the system is already processing a batch of slop. If not, then sump 62 will be pumped out and tank 28 filled. This will continue until complete or until settling tank 28 reaches its normal high condition, at which point diaphragm pump 68 will stop and wait for settling tank 28 to be emptied.

When tank 28 is full, or if an operator decides to operate the system manually, as in decision box 230, and if a specified settling period has elapsed, then the stratified slop will be allowed to flow out drain 80 and past conductivity sensor 94. Settling tank 28 will be drained until a preset amount of fluid has been drained or until low level switch 82 is set unless interrupted by one of two conditions. First, if three way valve 96 is set to direct fluid to waste water tank 36 and that tanks reaches its normal full condition then pumping will stop. Second, if three way valve 96 is set to direct solvent rich fluid to solvent tank 38, or 40, whichever may be selected, and the selected tank is full pumping will stop. In either case draining of settling tank 36 will be interrupted until the interrupting condition has been cleared.

As indicated in the fourth decision box, 240 of FIG. 2, sensor 94 tests for the conductivity of the flow. As long as the dirty waste water stream flows past sensor 94, the flow will be directed to wastewater tank 36. As soon as filter press 42 is available, wastewater tank 36 will be emptied. Before continuing with the next step one must check that (a) filter pump 120 is not already busy, and (b) that filter press 42 has been pre-coated. At present this is done manually, but these steps could be automated. When both conditions are satisfied wastewater tank 36 will be pumped out until it reaches its low level, at which point filter pump 120 will stop. Inasmuch as there is no further holding tank for the wastewater filtrate, this process will not normally be subject to further interruption. Once the wastewater tank has been pumped out filter press 42 will be dried, and any collected cake deposited in bin 166. Once wastewater tank 36 is empty, it is once again ready for filling from settling tank 28.

Returning to three way valve 96, when the conductivity changes, the condition at decision box 240 changes. Valve 96 operates to direct flow of solvent and solids to the second settling stage, in either tanks 38 or 40 according to the status at the fifth decision box, 250. When the selected one of tanks 38 or 40 is full, the other tank will be pumped out, and the state of valves 126 and 130 will be reversed. Once the appropriate settling time has been achieved, according to the sixth decision box 260, the clean solvent is removed to reclaimed solvent tank 48. In the seventh decision box, 270, there is a test to see if there is any more clean solvent to draw off through tap 142 of the selected tank, and if not, after checking that filter press 42 is available, sends a batch of sludge for processing. This test can be performed manually, or it may be automated. The pumping out process does not commence unless (a) reclaimed solvent tank 48 is full; (b) filter press pump 120 is otherwise busy or three way valve 112 is in-appropriately selected; or (c) filter press 42 has not been pre-coated. Once started, the process will be interrupted if buffer tank 50 is fill, but otherwise will continue until tank 38 or 40, as the case may be, reaches it low level condition.

In either the wastewater filtering or sludge filtering cases, filtering is followed by drying the solids, and removing them to landfill.

In summary, the solvent recovery apparatus described has a settling system of two stages, the first stage of settling occurring in tank 28 and the second stage of settling occurring in one or the other of tanks 38 or 40. An off-take in the form of either of decanting taps 142 allows the settled re-usable solvent portion of the stop to be collected. The solvent recovery apparatus also has a filtering system for receiving the balance of the input slop not drawn off through either of taps 42. The filtering system includes filter press 42 and its filter elements 150 for capturing the solids, and discharge, outlet header 152 whence waste water filtrate may be discarded when filter press 42 is processing a batch from waste water tank 36, and whence filtrate gleaned from the sludge received from either of tanks 38 or 40 may be returned to the settling system after processing through filter press 42. In this way, all of the input components of the slop are accounted for.

Mechanical variations are possible without departing from the spirit of the present invention. Although it may work well with other solvent blanket washes, the system was designed for use with a water emulsifiable commercial blanket wash solvent sold as "TS Blanket Wash" and available from the Toronto Star Limited in Toronto, Ontario, Canada. In this form, most of the components of the blanket wash are reclaimed. However, a small amount of the chemicals are stripped out by the water phase and need to be replaced. These chemicals, available as "TS Blanket Wash Rejuvenator" are added in specific amounts to the reclaimed solvent tank 48.

After repeated use, the quantity of ink oils in the reclaimed solvent tank has been found to stabilize at an acceptable level of about four per cent (4%) by weight, and the solvent has a clear, tawny appearance.

The filter aid pre-coating material employed on the filters is sold under the name Harborlite™ and is available in at least three grades—200M 400M and 900M. Other commercial filter aids may be acceptable. It is effective in removing the solids from the slop and enables the filter press more effectively to remove the finer solid particles. For example, the paper fibre lint is generally in the range of 2–4 mm in length with a mean diameter in the range of 20 to 50 microns. The ink pigments have average sizes, depending on hue, ranging from 0.025 microns (magenta) to 0.21 microns (yellow). The filters elements are sized accordingly.

In the preferred embodiment there are several pumps. Not all of these pumps are necessary, since gravity could be used in several cases, and a more manual system could, for example, rely on collecting filtrate, for example, in a vessel that could be emptied into one of the tanks of the settling system. Nonetheless, pumps are more convenient.

Furthermore, it is not necessary to have more than one settling stage, or to have alternate secondary settling vessels provided one has enough time to allow the collected slop to settle. The present inventors have found that in their circumstances a single secondary settling tank, like item 38, is sufficient, but alternating secondary tanks are preferable since this permits one tank always to be settling while the other is filling. One could use a greater number of secondary settling tanks if desired, operating on a duty cycle appropriate to the number chosen.

As concerns the times required for settling, while the initial period of one to two hours is adequate, as little as half an hour may be satisfactory under some circumstances, and a longer time, if available, could only improve stratification. Similarly, although the inventors consider 10 to 14 days to be an appropriate secondary settling time for the present batch size, a secondary settling time in the range of 5 to 30 days, or longer, may be found adequate depending on the purification criteria chosen. Solvent recovery apparatus 20 is provided with a manual override capability so that any element can be operated as independently of the logic described above or as may be required in the event of a malfunction.

Similarly, although primary settling tank 28 is drained from the bottom, it could also be drained with one or more decanting taps, or with a vacuum pump operable from above. Whether solvent rich layer 34 and middle layer 32 are drawn off first, or the lower layer 30, the process of directing one layer toward filter press 42 and the other layer to a further settling stage requires that the settling system be able to differentiate between the two types of strata, and direct them to different destinations accordingly. The particular type of stratum differentiator used could be optical, mechanical, or electrical, and could differentiate on the basis of density, viscosity capacitance, conductivity, inductance, emissivity, opacity or transmissivity, reflectivity, hue, or other suitable property depending on the nature of the components of the slop. As noted above, for the blanket wash slop discussed above, the preferred suitable property chosen is conductivity.

The elements of the present invention can be mounted as an integrated system on a single skid for easy installation and removal. The system is designed to operate at room temperature, that is, above freezing and below 50 degrees centigrade. Unlike distillation, it does not require heating or cooling processes, and does not employ ultrasonic devices or centrifuges, aside from the possible use of a spin dryer to wring solvent out of damp cloths. Given that TS Blanket Wash is not corrosive, and the process is designed to take place at room temperature it is acceptable, and preferable, to use PVC piping, which is inexpensive and relatively easy to assemble. Different sizes of pipe other than those indicated herein could be used, and, if desired one could substitute other materials, including stainless steel, copper, rubber hose, and so on. Similarly, plastic tanks can be used, and the entire system may be assembled on a unitary chasis to permit ease of shipping and installation.

This description is made with reference to the preferred embodiment of the invention. However, it is possible to make other embodiments that employ the principles of the invention and that fall within its spirit and scope as defined by the following claims and their equivalents.

We claim:

1. A solvent recovery apparatus for reclaiming solvent from an emulsified water, oils, solids and solvent slop, comprising:

a settling system for receiving and settling the slop;

said settling system including a first settling stage including a first settling tank into which slop can be emptied, and a second settling stage having at least one secondary settling vessel including a second settling tank;

first piping connected to said first settling tank, said first piping having an outlet emptying into said second settling tank;

a filtering system;

second piping in fluid connection with said first settling tank for carrying fluid to said filtering system;

valving controls operable selectively to direct a solvent rich stratum of said slop through said first piping from said first settling tank to said second settling tank where said solvent rich portion can settle into a re-useable portion and a sludge, and said valving controls being operable to direct a solvent poor stratum of said slop from said first settling tank through said second piping to said filtering system;

an off-take connected to said second settling tank, said off-take being operable to decant a settled, re-usable solvent portion of the slop from said second tank, said off-take being located in a position to permit a sludge to remain in said second tank;

said filtering system having at least one filter element and being operable to separate the solids, a waste water filtrate and a liquid solvent filtrate;

third piping connecting said second tank to said filtering system;

said second tank having a drain through which the sludge can exit said second tank and be carried through said third piping to said filtering system; and valving operable to control flow through said drain of said second settling tank; the filtering system having an intake connected selectively to receive (a) solvent poor strata from the first settling stage, and (b) sludge from the second settling stage; and the filtering system has a drain through which liquid solvent filtrate can be returned to the settling system.

2. The recovery apparatus of claim 1 wherein the second settling stage comprises at least two alternately selectable settling vessels.

3. The solvent recovery apparatus of claim 1 wherein the filtering system includes a dryer for drying solids captured by the at least one filter.

4. The solvent recovery apparatus of claim 1 wherein the dryer is an air dryer and the apparatus has means for collecting solvent entrained during drying of the solids.

5. The recovery apparatus of claim 1 wherein said apparatus is for use with a low-volatility non-corrosive washing solvent, and said first and second settling stages are made of plastic and connected by plastic tubing.

6. A solvent recovery apparatus for reclaiming solvent from an emulsified water, oils, solids and solvent slop, comprising:

a settling system for receiving and settling the slop;

said settling system including a first settling stage including a first settling tank into which slop can be emptied, and a second settling stage having at least second and third alternately selectable settling vessels including second and third settling tanks being capable of receiving a first portion of the slop from said first settling tank;

first piping in fluid connection with said first tank, said first piping having alternately selectable outlets emptying into said second and third settling tanks;

an intermediate tank for receiving another portion of the slop from the settling system;

second piping in fluid connection with said first settling tank, said second piping having an outlet emptying into said intermediate tank;

each of said second and third settling tanks having an off-take connected thereto, said off-takes being operable to decant a settled, re-usable solvent portion of the slop from said second and third tanks respectively, said off-takes being located to permit a sludge to remain in said second and third tanks respectively;

first valving controls, said first controls being selectively operable to direct a solvent rich stratum of the slop through said first piping alternately to said second and third settling tanks where said solvent rich portion can settle into a re-useable portion and a sludge, and said first controls being operable to direct a solvent poor stratum of said slop through said second piping from said first settling tank to said intermediate tank;

a filtering system for receiving the balance of the slop from the settling system, said filtering system having at least one filter element and being operable to separate the solids, a waste water filtrate and a liquid solvent filtrate;

third piping in fluid connection with said intermediate tank and having an outlet emptying into said filtering system;

second valving controls operable selectively to direct a solvent rich stratum of said slop to said second and third settling tanks where said solvent rich portion can settle into a re-useable portion and a sludge, and said second controls being operable to direct a solvent poor stratum of said slop from said first settling tank to said filtering system;

fourth piping connecting said second and third settling tanks to said filtering system;

said second and third tanks each having a drain through which said sludge can exit therefrom and be carried through said fourth piping to said filtering system;

valving operable to control flow through said drain of said second and third settling tanks;

the filtering system having an intake connected selectively to receive (a) solvent poor strata from the first settling stage, and (b) sludge from the second settling stage; and the filtering system has a drain through which liquid solvent filtrate can be returned to the settling system.

7. The recovery apparatus of claim 1 wherein the second settling stage comprises at least two alternately selectable settling vessels.

8. The solvent recovery apparatus of claim 6 wherein the filtering system includes a dryer for drying solids captured by the at least one filter.

9. The solvent recovery apparatus of claim 1 wherein the dryer is an air dryer and the apparatus has means for collecting solvent entrained during drying of the solids.

10. The recovery apparatus of claim 6 wherein said apparatus is for use with a low-volatility non-corrosive washing solvent, and said first and second settling stages are made of plastic and connected by plastic tubing.

* * * * *